(12) United States Patent
Marissen et al.

(10) Patent No.: US 10,112,356 B2
(45) Date of Patent: Oct. 30, 2018

(54) METHOD OF PRODUCING A FILAMENT WOUND CURVED PRODUCT AND PRODUCT OBTAINED THEREBY

(71) Applicant: DSM IP ASSETS B.V., Heerlen (NL)

(72) Inventors: Roelof Marissen, Born (NL); Lucas Van Den Akker, Vught (NL); Sotiris Koussios, Delft (NL); Hen Hoefnagels, Hulsberg (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/016,848

(22) Filed: Sep. 3, 2013

(65) Prior Publication Data

US 2014/0000796 A1    Jan. 2, 2014

Related U.S. Application Data

(62) Division of application No. 12/595,910, filed as application No. PCT/EP2008/003099 on Apr. 17, 2008, now abandoned.

(30) Foreign Application Priority Data

Apr. 18, 2007  (EP) ..................................... 07007850
Apr. 2, 2008   (EP) ..................................... 08006711

(51) Int. Cl.

| | | |
|---|---|---|
| *B29D 25/00* | (2006.01) | |
| *B29C 47/00* | (2006.01) | |
| *B29C 53/56* | (2006.01) | |
| *B29C 70/04* | (2006.01) | |
| *B29C 70/34* | (2006.01) | |
| *B29C 70/54* | (2006.01) | |
| *F41H 1/08* | (2006.01) | |
| *H01Q 1/42* | (2006.01) | |
| *B29C 53/80* | (2006.01) | |
| *B29K 105/06* | (2006.01) | |
| *B29K 105/00* | (2006.01) | |
| *B29L 31/34* | (2006.01) | |
| *B29L 31/48* | (2006.01) | |

(52) U.S. Cl.
CPC .......... *B29D 25/00* (2013.01); *B29C 47/0014* (2013.01); *B29C 53/564* (2013.01); *B29C 70/04* (2013.01); *B29C 70/347* (2013.01); *B29C 70/543* (2013.01); *F41H 1/08* (2013.01); *H01Q 1/42* (2013.01); *B29C 47/00* (2013.01); *B29C 47/0019* (2013.01); *B29C 53/8066* (2013.01); *B29K 2105/06* (2013.01); *B29K 2105/256* (2013.01); *B29K 2223/0683* (2013.01); *B29L 2031/3456* (2013.01); *B29L 2031/4821* (2013.01); *Y10T 156/1002* (2015.01); *Y10T 428/1369* (2015.01); *Y10T 428/24* (2015.01); *Y10T 428/24628* (2015.01); *Y10T 428/24736* (2015.01)

(58) Field of Classification Search
CPC . B29C 70/347; B29C 47/0014; B29C 53/564; B29C 53/8066; B29C 53/60; B29C 70/44; B29D 25/00; B29K 2105/06; B29K 2105/256; B29K 2223/0683; B29L 2031/3456; B29L 2031/4821; B29L 2031/768; F41H 5/0478; F41H 5/0485
USPC ........................................... 264/136; 156/184
See application file for complete search history.

(56) References Cited

U.S. PATENT DOCUMENTS

| | | |
|---|---|---|
| 2,448,114 A | 8/1948 | Olson et al. |
| 3,623,928 A | 11/1971 | Wincklhofer et al. |
| 4,010,054 A | 3/1977 | Bradt |
| 4,403,012 A | 9/1983 | Harpell et al. |
| 4,613,535 A * | 9/1986 | Harpell et al. ................. 428/113 |
| 4,639,387 A * | 1/1987 | Epel ........................ B29B 15/14 428/113 |
| 4,988,469 A | 1/1991 | Reavely et al. |
| 5,019,715 A | 5/1991 | Sting et al. |
| 5,204,033 A | 4/1993 | Pearce et al. |
| 2004/0092183 A1* | 5/2004 | Geva ......................... B32B 5/02 442/134 |
| 2006/0257576 A1 | 11/2006 | Santo |
| 2009/0155511 A1 | 6/2009 | Marissen |

FOREIGN PATENT DOCUMENTS

| | | |
|---|---|---|
| EP | 1 400 342 | 3/2004 |
| EP | 2 650 111 A1 | 10/2013 |
| GB | 2 158 471 | 11/1985 |
| JP | 62-294465 | 12/1987 |
| JP | 1-305461 | 12/1989 |
| JP | 5-261831 | 10/1993 |
| JP | 5-278031 | 10/1993 |

(Continued)

OTHER PUBLICATIONS

International Search Report for PCT/EP2008/003099, dated Sep. 26, 2008.

*Primary Examiner* — Robert J Grun

(74) *Attorney, Agent, or Firm* — Nixon & Vanderhye P.C.

(57) ABSTRACT

The invention relates to a curved product, and in particular an armor product. The armor product is produced by a filament winding process in which a plurality of reinforcing elements in the form of fibers and/or tapes are impregnated with a polymer matrix and wound onto a mandrel. The polymer matrix comprises a solution and/or dispersion of a polymer in a carrier fluid, which carrier fluid is at least partly evaporated during and/or after winding. The armor product comprises a high amount of reinforcing elements with respect to the total mass of the product.

16 Claims, No Drawings

(56) References Cited

FOREIGN PATENT DOCUMENTS

| | | |
|---|---|---|
| JP | 6-270149 | 9/1994 |
| JP | 9-6182 | 1/1997 |
| JP | 9-167192 | 6/1997 |
| JP | 9-277390 | 10/1997 |
| JP | 2000-158549 | 6/2000 |
| JP | 2000-334853 | 12/2000 |
| JP | 2001-254255 | 9/2001 |
| JP | 2002-301772 | 10/2002 |
| JP | 2005-219228 | 8/2005 |
| WO | 98/30374 | 7/1998 |
| WO | 2005/065910 | 7/2005 |
| WO | 2005/066401 | 7/2005 |
| WO | 2007/005043 | 1/2007 |

* cited by examiner

METHOD OF PRODUCING A FILAMENT WOUND CURVED PRODUCT AND PRODUCT OBTAINED THEREBY

This application is a divisional of commonly owned U.S. application Ser. No. 12/595,910, filed Jan. 14, 2010 (now abandoned), which is the national phase application under 35 USC § 371 of PCT/EP2008/003099, filed Apr. 17, 2008, which designated the US and claims priority to European Application No. 07007850.6, filed Apr. 18, 2007, and European Application No. 08006711.9, filed Apr. 2, 2008, the entire contents of which are hereby incorporated by reference.

The invention relates to a curved product, preferably a curved armour product, comprising composites of high strength fibers or reinforcing elements and a polymer matrix. The invention also relates to a method for producing such a curved product. The invention in particular relates to a helmet, specifically a combat helmet, as well as to other curved products such as radomes.

High performance stand-alone armour products are mainly made of composites of high strength fibers and a polymer matrix. The reason for using such composites is that the produced armour combines good high speed projectile ballistic protection with low mass. Only armour which should be resistant against extreme threats may comprise other materials. The composite material layers are in that case provided with metallic and/or ceramic strike faces. The required high quality of the composites armour leads to industrial production of large amounts of fiber-polymer armour prepregs. These prepregs can be stacked and pressed and thus be processed to produce armour plates. Armour prepregs are typically made from fibers with a high tenacity and usually contain fibers in two directions only. These directions are generally about perpendicular to each other. Polymer matrix content is preferably low (for instance <25% by mass), or the polymer matrix is even absent in case dry fabrics are used. Armour prepregs are therefore highly optimized for ballistic protection. Examples of particularly suitable armour prepregs include Dyneema® UD from DSM. In view of their optimized character, application of such armour prepregs is a typical first choice for production of protective combat gear.

However, production of curved products and in particular of highly 3-D curved products is problematic. Wrinkles typically occur in such products. Wrinkles are unfavourable for ballistic performance because they do decrease the local penetration resistance. Further, wrinkles also increase the occurring trauma upon impact, because they may partially "unfold" during impact. Various solutions to prevent these disadvantages have been published, such as applying cuts in the prepreg sheets, or by choosing the fiber orientation with respect to the edges of the rectangular prepreg sheets from which the helmets are produced. Although these known solutions have in some instances been successful in decreasing the adverse effect of wrinkling, complete disappearance of wrinkles has not been achieved or, if so, only on rare occasions. The main reason is that decreasing the occurrence of wrinkles generally requires a combination of technical measures having their own disadvantages. One example of such a disadvantage is cutting. Cut fibers generally offer less ballistic protection.

U.S. Pat. No. 2,448,114 describes a method for making curved thin-walled liners for use in armor products, such as combat helmets, on the basis of natural fibers impregnated with 40-50% by weight of resin. The liner as such does not have antiballistic properties.

GB2158471 describes a method for making armour articles, wherein fibers, impregnated with a conventional thermosetting resin are positioned according to a known pattern onto a mandrel using winding techniques.

The object of the present invention therefore is to provide an improved curved product, in particular an armour product, as well as a method to produce such product.

This object is achieved according to the invention by a curved product, preferably an armor product, produced by a filament winding process in which a plurality of reinforcing elements, having a strength of at least 1.6 GPa, are impregnated with a polymer matrix and wound onto a mandrel, whereby the polymer matrix comprises a solution and/or dispersion of a polymer in a carrier fluid, which carrier fluid is at least partly evaporated during and/or after winding, and wherein the amount of reinforcing elements is at least 60% of the total mass of the product.

According to the invention a novel method of producing highly curved 3-D products like combat helmets is provided by direct fiber placement, and in particular filament winding. With a curved product is meant in the context of this application, a product which, when positioned on a flat surface, has a ratio of maximum elevation with respect to said surface to the largest linear dimension within the projected surface of the product on the flat surface of at least 0.20. With a highly curved product is meant in the context of this application a product which, when positioned on a flat surface has a ratio of maximum elevation with respect to said surface to the largest linear dimension within the projected surface of the product on the flat surface of at least 1.00.

With the method according to the invention, curved armour products can be made that combine excellent protection power to low mass and good transverse deformation (trauma) resistance. The curved armour products moreover can be manufactured substantially free of wrinkles. Filament winding itself is a well known composite production process. However, it has never been attempted for making curved products, such as helmets and radomes, and combat helmets in particular, according to the method of this invention. Surprisingly, the quality of the filament wound curved armour product according to the invention is superior despite the fact that the product is made from fibers directly, instead of from the optimized armour prepregs known in the art. Moreover filament wound products generally comprise various locations having more than two fiber directions. This is normally disadvantageous for the ballistic performance thereof. This does not apply to the curved armour product of the present invention, due to the claimed combination of reinforcing elements and polymer matrix according to claim 2.

With the invented method a curved product can easily be obtained with a wide variety of wall thicknesses, as long as, in case of an armour product, the wall of the filament wound product is thick enough to have antiballistic performance. An additional advantage of the invention is that wall thickness is not practically limited. The winding process is preferably carried out such that the produced product has a constant thickness over substantially its entire surface. From a standpoint of antiballistic performance, the wall thickness of the product according to the invention is preferably above 3 mm, more preferably above 5 mm, even more preferably above 9 mm, and most preferably above 12 mm.

An embodiment of the invented method of production of a curved armour product and in particular a combat helmet comprises the steps of unwinding one or more fiber bobbins under some tension. In a first embodiment of the method, the fibers or reinforcing elements are preferably fed through a liquid matrix prior to actual winding, subsequently fed through a positioning eye on a rotating mandrel having approximately the inner shape of the curved product, such as a helmet. According to the invention, the liquid matrix is a polymer solution and/or polymer dispersion. The advantage of using polymer matrix solutions and/or dispersions is that the liquid carrier can be evaporated later and thus create the desired low matrix content in the final product. A second preferred method comprises dry winding and subsequently impregnation of the fiber structure with a polymer solution and/or dispersion from which the carrier fluid is subsequently evaporated.

The curved product can be removed from the mandrel after consolidation by drying of the solution and/or dispersion, can preferably be finished by edge trimming, and is then generally referred to as a preform. Preferably however, the curved product is subjected to a subsequent pressing process at elevated temperature and pressure for further compaction, in which subsequent pressing step the product is further shaped according to user defined dimensions.

In the process of manufacturing a curved product from a filament wound preform by compression moulding, the person skilled in the art will generally be able to choose a suitable combination of elevated temperature, pressure as well as time to adequately consolidate the product. The desired shaping will generally take place in about 1 to 60 minutes, preferably about 5 to 45 minutes, for a preform containing fibres made of ultra-high molecular polyethylene. Elevated pressures applied to the preform in producing a curved product, such as an armour product or radome, may vary widely, but are preferably higher than about 7 MPa, more preferably higher than about 10 MPa, even more preferably higher than about 15 MPa, a higher pressure yielding the better results. The elevated temperature is preferably selected in the range of 80° C. to 10° C. below the melting or softening temperature of the reinforcing elements, which range for most practical applications is between 80° C. and 145° C. After forming at elevated temperature and pressure, the curved product is preferably cooled under pressure until the product has reached a temperature lower than about 80° C.

An advantage of using polymer matrix dispersions over polymer matrix solutions is that these polymer matrices are better resistant against water after the carrier fluid has been substantially evaporated. Although the amount of carrier fluid with respect to the total amount of polymer matrix solution and/or dispersion can be selected within wide ranges, it turned out that the amount of carrier fluid is preferably at least 20% by mass, more preferably at least 30% by mass, and most preferably at least 40% by mass of the total weight of the polymer matrix solution and/or dispersion.

In a preferred embodiment of the method according to the invention the mandrel used in producing the product by the filament winding process is a similar product but made with another technology. More in particular, a conventional helmet or curved part with a thin shell is used as a mould for filament winding. In this way, only the outer part of the helmet or curved part consists of filament wound material. The advantage is that a thin helmet or curved part is more easily produced with conventional technology than a thick helmet or curved part, yet the advantage of filament winding is present to a large extent. Moreover, adaptation of the helmet or curved part to heavier threats is easy, just by applying additional windings.

Filament winding patterns are preferably restricted to "about geodetic patterns", although this is not necessary according to the invention. A fiber trajectory is geodetic when it spans the shortest distance between two points on the curved surface. The design of winding patterns requires special care regarding the choice of a pattern that fulfils the "about geodetic pattern" and preventing local accumulation of fibers at certain locations. Optimal curved products, for instance helmets, are preferably wound in a way that such accumulations are sufficiently "diluted" or spread over the helmet surface. Modern software known per se allows filament winding specialists to design winding patterns with sufficient "dilution" of local fiber accumulations. Also, trial and error methods may be employed to obtain adequate winding patterns.

Reinforcing elements may comprise drawn polymer films and/or fibers. Such drawn polymer films are preferably slitted to form tapes. Films or tapes may be prepared by feeding a polymeric powder between a combination of endless belts, compression-moulding the polymeric powder at a temperature below the melting point thereof and rolling the resultant compression-moulded polymer thereby forming a film. Another preferred process for the formation of films comprises feeding a polymer to an extruder, extruding a film at a temperature above the melting point thereof and drawing the extruded polymer film. If desired, prior to feeding the polymer to the extruder, the polymer may be mixed with a suitable liquid organic compound, for instance to form a gel, such as is preferably the case when using ultra high molecular weight polyethylene. Drawing, preferably uniaxial drawing, of the films to produce tapes may be carried out by means known in the art. Such means comprise extrusion stretching and tensile stretching on suitable drawing units. To attain increased mechanical strength and stiffness, drawing may be carried out in multiple steps. The resulting drawn tapes may be used as such for filament winding the curved product, including an armour product, or they may be cut to their desired width, or split along the direction of drawing. The width of suitable unidirectional tapes usually depends on the width of the film from which they are produced. In the product and method according to the invention, the width of the tapes preferably is at least 3 mm, more preferably at least 5 mm. The width of the tapes preferably is less than 30 mm, more preferably less than 15 mm, and most preferably less than 10 mm, to further prevent wrinkling during the winding process. The areal density of the tapes can be varied over a large range, for instance between 5 and 200 g/m$^2$. Preferred areal density is between 10 and 120 g/m$^2$, more preferred between 15 and 80 g/m$^2$ and most preferred between 20 and 60 g/m$^2$.

A particularly preferred product comprises polyethylene fibers and/or aramid fibers with a tensile strength of at least 1.6 GPa, more preferably at least 1.8 GPa. Polyethylene fibers are preferably produced by gel spinning, but solid state produced fibers (or films) from so-called disentangled polymer powders are suitable as well. Even glass fibers or carbon fibers are suitable, provided that the tensile strength is at least 1.6 GPa, more preferably at least 1.8 GPa or higher. Other fibers to be suitably applied in the product according to the invention are drawn thermoplastic polymer fibers, comprising poly(p-phenylene-2, 6-benzobisoxazole) fibers (PBO, Zylon®), poly(2,6-diimidazo-(4,5b-4',5'e) pyridinylene-1,4(2,5-dihydroxy)phenylene) fibers (better known as M5 fibers), and ultrahigh molecular weight polyethylene or polypropylene fibers, and/or combinations of the above fibers.

A preferred product according to the invention comprises an amount of reinforcing elements of at least 60% of the total mass of the product. Even more preferred is a product wherein the amount of reinforcing elements is at least 75% of the total mass of the product, and most preferably at least 85% of the total mass of the product. Such high mass (or volume) fractions of reinforcing elements in the armour product are very beneficial to the antiballistic properties thereof. These high reinforcement fractions (or low polymer matrix fractions) are normally not achieved in composite products made by any method and by filament winding in particular. Such "polymer matrix poor" products normally lead to resin starved areas of the product. These areas are unwanted. When filament winding composite products, polymer matrix fractions of around 60% by mass and more are not uncommon. Some matrix material may be removed by applying bleeding and/or peelply materials, but this is cumbersome. Moreover polymer matrix fractions less than 40% by mass are not achievable by such process. This problem has been solved according to the invention by using polymer matrix solutions and/or dispersions. The process yields substantially complete impregnation of the fibers and/or films but after drying only 20% by mass of matrix is typically present.

In one particularly preferred embodiment, a filament wound helmet from polyethylene fibers can even be made without a matrix, just by sintering fibers together under high pressure and temperature. The pressing procedure is in essential described in WO 2005/065910, for helmets that are not produced from filament winding.

The invention also relates to the use of the product of the invention as a radome. The invention further relates to a radome for enclosing and protecting a radar antenna, particularly the type carried by aircrafts, said radome comprising the product of the invention. By radome is herein understood any structure used to protect electromagnetic radiation equipment, e.g. radar equipment, for e.g. aircraft, ground or ship based. In case that the radome is aircraft based, the radome can be shaped and positioned as the nose of the aircraft, a portion of the wing or fuselage or the tail of the aircraft. The advantage of the radome of the invention is that is has an improved distribution of stiffness while having also an improved E-field distribution.

A further important advantage of the inventive radome is that said radome has a lighter weight, especially when gel spun fibers of ultrahigh molecular weight polyethylene are used thereof, than known radomes with similar constructions while having improved structural and electromagnetic functions. It was surprisingly discovered that the inventive radome it is not tuned to a narrow frequency band as compared to known radomes. Yet a further important advantage of the inventive radome is that it has an increased resistance against projectiles, e.g. in case of military aircrafts, as well as against bird strikes, hail and the like.

Suitable polymer matrices to be used in the product and method according to the invention comprise polymers as used for standard composites. The term polymeric matrix refers to a material that binds or holds the reinforcing elements together. The matrix may enclose the reinforcing elements in their entirety or in part. The matrix material according to the invention comprises a solution and/or dispersion of a polymer in a carrier fluid. The polymer may be a thermoplastic material or mixtures of a thermosetting material and a thermoplastic material. Suitable thermosetting and thermoplastic polymers are enumerated in, for example, WO 91/12136 A1 (pages 15-21). In case the polymeric matrix comprises a thermoplastic polymer, poly- vinyls, polyacrylics, polyolefins or thermoplastic elastomeric block copolymers such as polyisopropene-polyethylene-butylene-polystyrene or polystyrene-polyisoprene-polystyrene block copolymers are preferably selected. More preferably the polymeric matrix comprises a thermoplastic polymer. Most preferably the polymeric matrix is a thermoplastic polymer.

In a preferred embodiment of the product according to the invention, the modulus of at least a part of the polymer matrix is below 100 MPa. In this preferred embodiment of the product therefore, at least a part of the reinforcing elements is impregnated with a polymer matrix of which the modulus is below 100 MPa. Even more preferred is a product wherein the modulus of at least a part of the polymer matrix is above 500 MPa. In this preferred embodiment at least a part of the reinforcing elements are impregnated with a polymer matrix of which the modulus is above 500 MPa. Matrix materials with a low modulus are more advantageous for protection against perforation. Rubbery matrices with a modulus below 100 MPa can be applied. On the other hand, stiffer matrices offer better transverse strength and stiffness of the helmet. It is also possible and preferred to produce a part of the helmet with a stiff resin and a part with a low modulus polymer. The different possibilities can be obtained by mere experimentation of persons skilled in the art.

In a preferred embodiment the curved product is produced by filament winding reinforcing elements onto a mandrel with two polar surfaces, which mandrel rotates around a central shaft, the polar surfaces being that part of the mandrel where the central shaft enters or exits. Reinforcing elements are positioned onto such a mandrel substantially over its surface and its polar surfaces. In this way a substantially closed product is obtained which is subsequently partitioned in two halves, thus producing two similar curved products in one time. Due to the presence of the shaft during winding, the apex of the curved products will generally have an opening when the shaft is removed after the winding process. Such an opening, if present after winding and/or pressing, may for instance be closed by inserting in it a fitting plug. This process may be further enhanced by adopting a non-geodetic pattern on the two polar surfaces. Because of the presence of the shaft, the reinforcing elements may be wound around this shaft under tension and in a non-geodetic pattern (in the end product). When removing the shaft, the non-geodetic reinforcing elements under tension reposition from their non-geodetic pattern to a pattern that is closer to a geodetic pattern, thereby reducing the opening or clamping and thereby better fixing the plug.

In another preferred embodiment the curved product is manufactured by simultaneously positioning a plurality of reinforcing elements such as fiber bundles onto the mandrel using supply means during the filament winding process. Suitable supply means comprise a creel provided with bobbins, and eventually guiding means, for instance in the form of dispensing tubes, to guide the reinforcement elements over the surface of the mandrel. This measure allows for filament winding with reduced production times, while keeping the device simple. It is especially advantageous in case of producing large series of products. A plurality of reinforcing elements is preferably comprised between 10 and 60 reinforcing elements, and more preferably between 24 and 48. A compromise between manageability and production time is hereby obtained.

During the filament winding process the supply means preferably move relative to the mandrel. In still another preferred embodiment the supply means adjust the length of a reinforcing element spanning the distance between the mandrel surface and the supply means. This measure leads to a more constant tension on the fibers and therefore to a product with better quality. Adjusting the free length of the reinforcing elements between supply means and mandrel surface may for instance be carried out by providing supply means in the form of fiber dispensing tubes, provided with electromotors that act on the fiber bobbins.

The present invention will now be further elucidated by the following example and comparative experiment, without however being limited thereto.

EXAMPLES I AND COMPARATIVE EXPERIMENT A

Antiballistic Dyneema® UHMWPE fibers of type SK76 1760 dTex were wound onto a mandrel in the shape of a combat helmet. The mean tension of the fibers was about 14 N during winding. The fibers were impregnated with an aqueous dispersion (mixing ratio 1:1 on a weight basis) of a Kraton® thermoplastic polymer. After winding the produced helmets were dried in an oven at about 80° C. during 24 hours to evaporate the water from the polymer matrix. The density of the matrix material after drying is 1040 kg/m³. The dried helmet preforms were then further consolidated under vacuum in an autoclave at a temperature of about 100° C. during 2.5 hours. Compression pressure was about 20 bar. After autoclave moulding the cylindrical product thus produced was cut into two halves, thereby also removing the mandrel. The two product halves were then post-processed by pressing them in a press between two metal moulds at a temperature of 125° C. and at a maximum pressure of about 165 bar during 45 minutes.

The characteristics of the helmets produced according to the invention are summarized in Table 1.

TABLE 1 characteristics of produced helmets.

| Example | I |
|---|---|
| Thickness [mm] | 5.5 |
| Surface area [cm2] | 1295 |
| Weight [kg] | 0.98 |
| Pressure moulded | Yes |

Testing was performed according to the STANAG 2920 standard. Typical V50 values for conventionally produced helmets made from 38 ply Dyneema® HB25 at a temperature of 125° C. and at a maximum pressure of about 165 bar during 45 minutes are 622 m/sec for a helmet with a thickness of 7.8 mm, and 730 m/sec for a helmet with a thickness of 9.2 mm (46 ply Dyneema® HB25). Results obtained are summarized in Table 2.

TABLE 2 anti-ballistic results

| | Areal Density [kg/m²] | $V_{50}$ [m/s] | $E_{abs}$ [J/kg/m²] |
|---|---|---|---|
| Example I | 5.5 | 564 | 31.8 |
| Comparative Experiment A | 8.7 | 622 | 24.4 |

When assuming that the $V_{50}$ is linearly dependent on the thickness, a conventionally produced helmet of 5.5 mm thickness would accomplish a $V_{50}$ of 438 m/s, whereas the filament wound helmet according to the invention (Example I) obtained a V50 of 564 m/s which is 126 m/s higher.

The known helmet (Comparative Experiment A) made out of 38 plies HB25 has a $V_{50}$ of 622 m/s and an areal density of 7.8 kg/m2. The absorbed energy $E_{abs}$ for this helmet is therefore $(0.5*m_{FSP}*V^2_{50})/AD=24.4$ J/kg/m². The absorbed energy of the filament wound helmet is higher, so the filament wound helmet performed better.

Based on the amount of energy a helmet can absorb, a filament wound helmet according to the invention performs better than a conventionally pressed helmet. The typical value for the absorbed energy of a conventional helmet is 24.4 J/kg/m². The absorbed energy of a helmet according to the invention lies above 32.4 J/kg/m², a performance increase of at least 30%. Adding to the performance increase the filament winding process offers other advantages such as the absence of wrinkles in the final product, the cheaper starting materials (yarns+resin vs. cross-ply prepreg), the freedom of combining different materials, the low amount of waste and the opportunity for far-reaching automation.

The invention claimed is:

1. A filament winding process for producing a 3D curved product comprising: (a) winding a plurality of reinforcing elements having a tensile strength of at least 1.6 GPa onto a mandrel which substantially approximates an inner shape of the 3D curved product to form a 3D curved fiber structure preform having a shape which substantially approximates the 3D curved product, (b) impregnating the plurality of reinforcing elements or the 3D curved fiber structure preform with a polymer matrix comprised of a solution and/or a dispersion of a polymer in a carrier fluid, (c) at least partly evaporating the carrier fluid from the solution and/or dispersion during and/or after winding the reinforcing elements onto the mandrel according to step (a), (d) consolidating the 3D curved fiber structure preform under elevated pressure onto the mandrel to thereby form the 3D curved fiber structure preform having a shape which substantially approximates the 3D curved product, (e) cutting the 3D curved fiber structure preform thereby also removing the mandrel, and (f) subjecting the fiber structure to a subsequent pressing process at elevated temperature and pressure to form the 3D curved product, wherein the reinforcing elements are present in an amount of at least 85% of the total mass of the 3D curved product.

2. The filament winding process according to claim 1, wherein the reinforcing element is a fiber.

3. The filament winding process according to claim 1, wherein the reinforcing element is a tape.

4. The filament winding process according to claim 1, wherein the reinforcing element is aramid.

5. The filament winding process according to claim 1, wherein the reinforcing element is ultrahigh molecular weight polyethylene.

6. The filament winding process according to claim 1, wherein the reinforcing element is glass fiber, carbon fiber, poly(p-phenylene-2, 6-benzobisoxazole) fiber, poly(2,6-diimidazo-(4,5b-4',5'e)pyridinylene-1,4(2,5-dihydroxy)phenylene) fiber, and polyethylene or polypropylene fibers, and/or combinations of the above fibers.

7. The filament winding process according to claim 1, wherein the polymer matrix comprises a thermoplastic polymer.

8. The filament winding process according to claim 1, wherein the polymer matrix comprises polyvinyls, polyacrylics, polyolefins, thermoplastic elastomeric block copolymers, polyisopropene-polyethylene-butylene-polystyrene, or polystyrene-polyisoprene-polystyrene block copolymers.

9. The filament winding process according to claim 1, wherein the filaments are positioned according to a pattern that is geodetic.

10. The filament winding process according to claim 1, wherein the fiber structure has a wall thickness of at least 3 mm.

11. The filament winding process according to claim 1, further comprising pressing the fiber structure to obtain a pressed product.

12. The filament winding process according to claim 11, wherein the pressed product is an armor product.

13. The filament winding process according to claim 11, wherein the pressed product is a helmet.

14. The filament winding process according to claim 11, wherein the pressed product is a radome.

15. A filament winding process for producing a 3D curved product comprising:
(a) winding a plurality of reinforcing elements having a tensile strength of at least 1.6 GPa onto a mandrel which substantially approximates an inner shape of the 3D curved product to form a 3D curved fiber structure having a shape which substantially approximates the 3D curved product such that when positioned on a flat surface the 3D curved fiber structure has a ratio of maximum elevation with respect to the flat surface relative to a largest linear dimension within a projected surface of the 3D curved fiber structure onto the flat surface of at least 0.20,
(b) impregnating the plurality of reinforcing elements or the 3D curved fiber structure with a polymer matrix comprised of a solution and/or a dispersion of a polymer in a carrier fluid,
(c) at least partly evaporating the carrier fluid from the solution and/or dispersion during and/or after winding the reinforcing elements onto the mandrel according to step (a),
(d) consolidating the 3D curved fiber structure under elevated pressure onto the mandrel to thereby form a 3D curved fiber structure preform having a shape which substantially approximates the 3D curved product,
(e) cutting the 3D curved fiber structure preform thereby also removing the mandrel, and
(f) subjecting the 3D curved fiber structure preform to a subsequent pressing process at elevated temperature and pressure to thereby form the 3D curved product, wherein the reinforcing elements are present in an amount of at least 85% the total mass of the 3D curved product.

16. The filament winding process according to claim 15, wherein the ratio of maximum elevation to the largest linear dimension within a projected surface of the 3D curved product onto the flat surface is at least 1.00.

* * * * *